US006738100B2

(12) United States Patent
Hampapur et al.

(10) Patent No.: US 6,738,100 B2
(45) Date of Patent: May 18, 2004

(54) METHOD FOR DETECTING SCENE CHANGES IN A DIGITAL VIDEO STREAM

(75) Inventors: Arun Hampapur, White Plains, NY (US); Mojgan Monika Gorkani, San Francisco, CA (US); Chiao-Fe Shu, San Mateo, CA (US); Amarnath Gupta, Redwood City, CA (US)

(73) Assignee: Virage, Inc., San Mateo, CA (US)

( * ) Notice: Subject to any disclaimer, the term of this patent is extended or adjusted under 35 U.S.C. 154(b) by 207 days.

(21) Appl. No.: 09/742,937

(22) Filed: Dec. 20, 2000

(65) Prior Publication Data

US 2001/0003468 A1 Jun. 14, 2001

Related U.S. Application Data

(63) Continuation of application No. 08/870,836, filed on Jun. 6, 1997.
(60) Provisional application No. 60/019,281, filed on Jun. 7, 1996.

(51) Int. Cl.[7] .................................................. H04N 7/18
(52) U.S. Cl. .................... 348/702; 348/701; 348/699
(58) Field of Search .................... 375/240.1–240.19, 375/240.25–240.29; 348/239, 699, 702, 701

(56) References Cited

U.S. PATENT DOCUMENTS

| | | | |
|---|---|---|---|
| 4,390,904 | A | 6/1983 | Johnston et al. |
| 5,099,322 | A | 3/1992 | Gove |
| 5,245,436 | A | 9/1993 | Alattar |
| 5,259,040 | A | 11/1993 | Hanna |
| 5,283,645 | A | 2/1994 | Alattar |

(List continued on next page.)

FOREIGN PATENT DOCUMENTS

| | | |
|---|---|---|
| EP | 0 660 249 A1 | 12/1994 |
| EP | 0 660 327 A2 | 12/1994 |
| EP | 0 636 994 A1 | 2/1995 |
| EP | 0 675 496 A2 | 3/1995 |
| EP | 0 690 413 A2 | 6/1995 |
| JP | 3 085 076 A | 4/1991 |
| JP | 07 079 431 A | 3/1995 |
| JP | 08 079 695 A | 3/1996 |
| WO | WO 9605696 | 2/1996 |

OTHER PUBLICATIONS

Hampapur et al., Multimedia Tools and Applications, 1, 9–46, 1995, "Production Model Based Digital Video Segmentation."
Hampapur, dissertation, University of Michigan, 185 pages, 1995, "Designing Video Data Management Systems."
Jain et al., Machine Vision, McGraw–Hill Series in Computer Science, Chapter 4, pp. 112–127, "Image Filtering."
Jain et al., Machine Vision, McGraw–Hill Series in Computer Science, Chapter 5, pp. 140–149, "Edge Detection."
Nagasaka et al., Visual Database Systems, II, pp. 113–127, Copyright 1992, "Automatic Video Indexing and Full–Video Search for Object Appearances."

*Primary Examiner*—Andy Rao
(74) *Attorney, Agent, or Firm*—Knobbe Martens Olson & Bear LLP

(57) ABSTRACT

A system and method that processes video to extract a keyframe-based adequate visual representation. The method utilizes a hierarchical processing technique. The first stage in the hierarchy extracts a chromatic difference metric from a pair of video frames. An initial set of frames is chosen based on the chromatic metric and a threshold. A structural difference measurement is extracted from this initial set of frames. A second threshold is used to select key frames from the initial set. The first and second thresholds are user selectable. The output of this process is the visual representation. The method is extensible to any number of metrics and any number of levels.

12 Claims, 11 Drawing Sheets

A VIDEO DATABASE SYSTEM

U.S. PATENT DOCUMENTS

| | | |
|---|---|---|
| 5,404,174 A | 4/1995 | Sugahara |
| 5,459,517 A | 10/1995 | Kunitake et al. |
| 5,471,239 A | 11/1995 | Hill et al. |
| 5,485,611 A | 1/1996 | Astle |
| 5,488,482 A | 1/1996 | Ueda et al. |
| 5,537,528 A * | 7/1996 | Takahashi et al. .......... 715/512 |
| 5,606,359 A | 2/1997 | Youden et al. |
| 5,635,982 A | 6/1997 | Zhang et al. |
| 5,664,227 A | 9/1997 | Maudlin et al. |
| 5,734,735 A | 3/1998 | Coleman, Jr. |
| 5,745,126 A | 4/1998 | Jain et al. |
| 5,764,921 A | 6/1998 | Banham et al. |
| 5,767,922 A | 6/1998 | Zabih et al. |
| 5,802,361 A * | 9/1998 | Wang et al. ................. 382/217 |
| 5,835,163 A | 11/1998 | Liou et al. |
| 6,014,183 A | 1/2000 | Hoang |
| 6,141,709 A * | 10/2000 | Cutter ........................ 710/100 |

\* cited by examiner

EXAMPLES TO ILLUSTRATE THE CHROMATIC AND STRUCTURAL PROPERTIES OF IMAGES

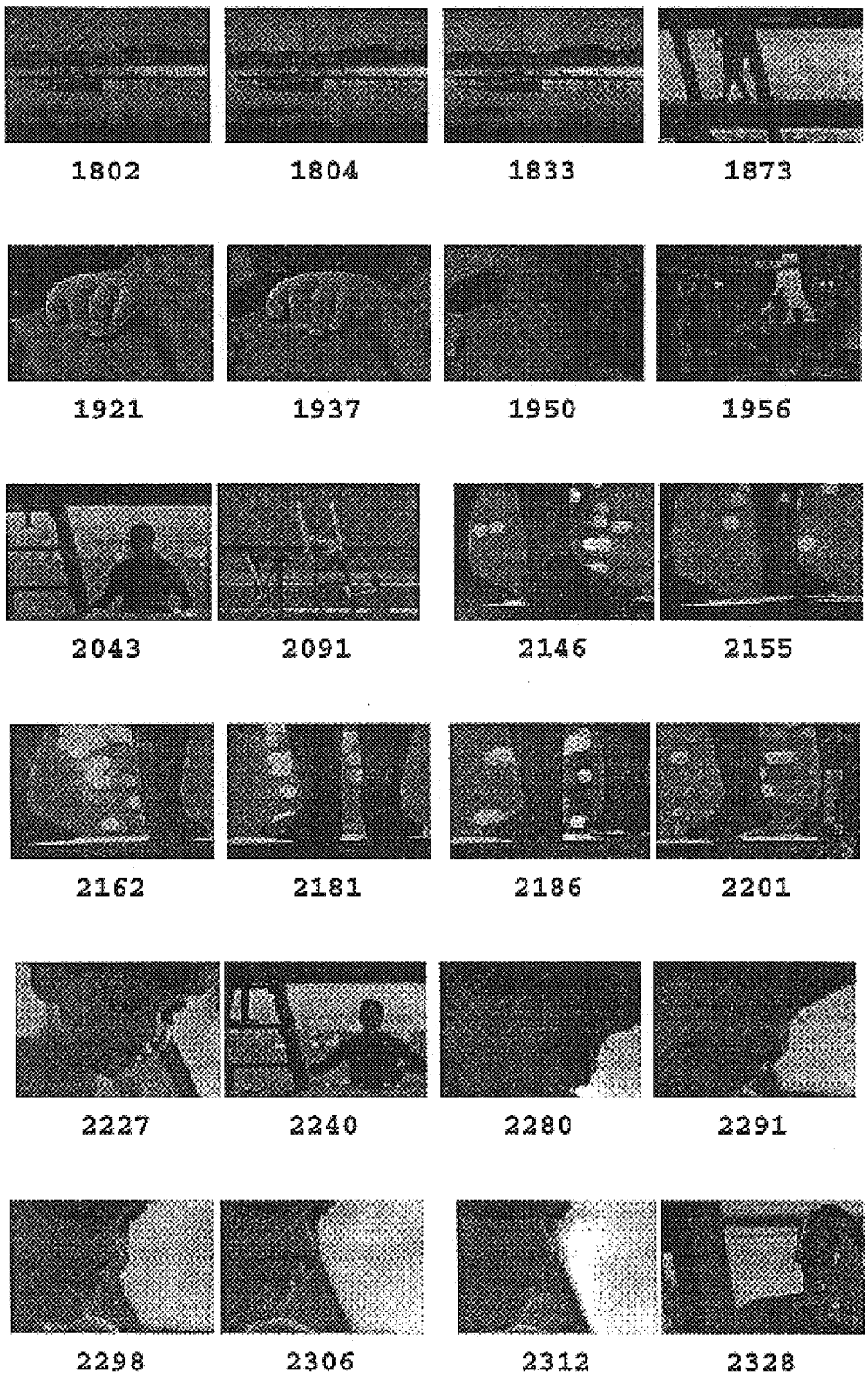
Output of Stage 1: Chromatic Difference
Figure 9 The Results of Applying the invention to 600 frames of a Video sequence

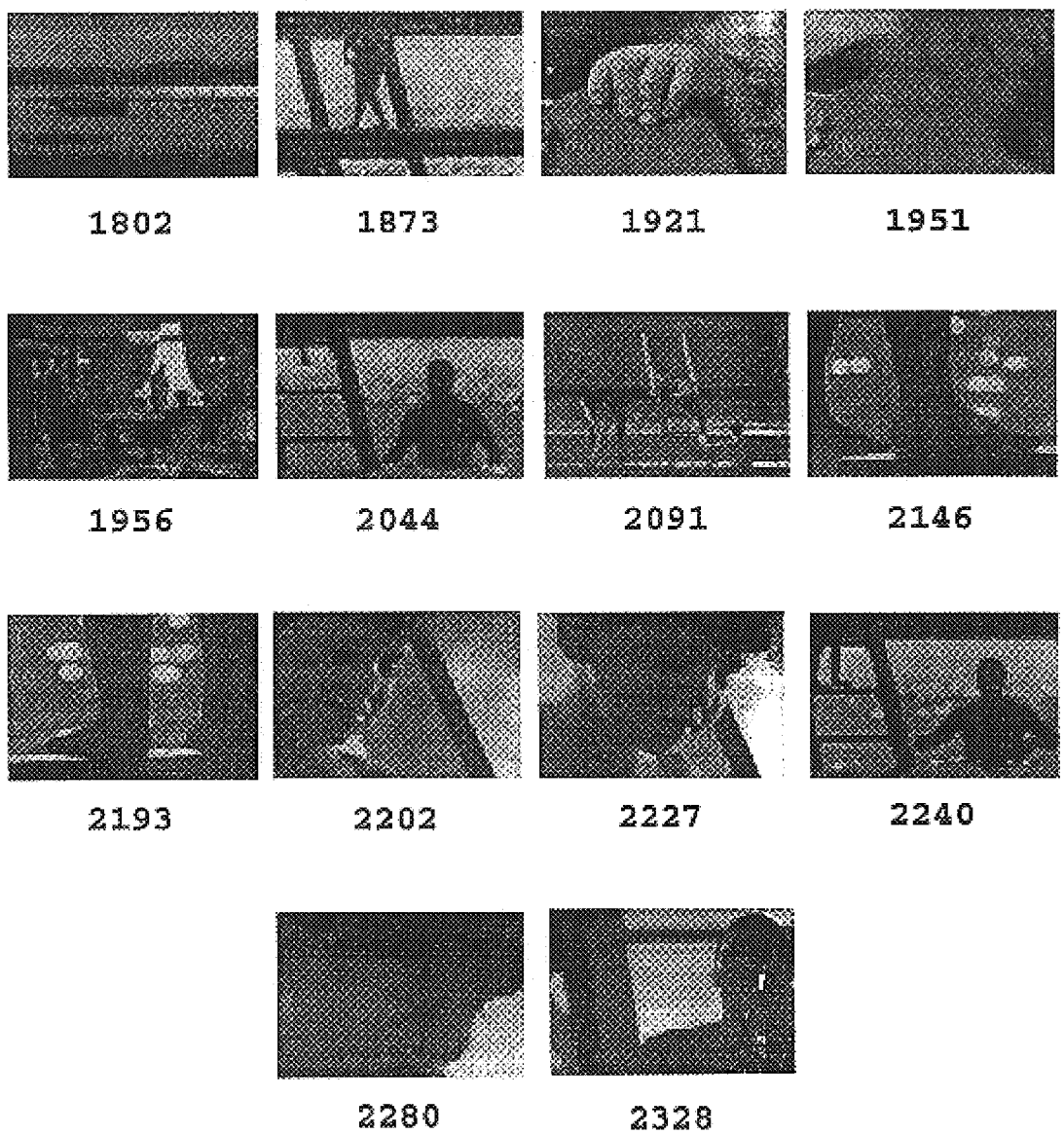
Figure 10 The Results of Applying the invention to 600 frames of a Video sequence

METHOD FOR DETECTING SCENE CHANGES IN A DIGITAL VIDEO STREAM

RELATED APPLICATIONS

This application is a continuation of U.S. patent application Ser. No. 08/870,836, filed Jun. 6, 1997, for "KEY FRAME SELECTION" and claims the benefit of the filing date of U.S. patent application Ser. No. 60/019,281, filed Jun. 7, 1996, for "VIRAGE VIDEO: SHOT SEGMENTATION AND KEY FRAME SELECTION", to Hampapur.

This invention was made with Government support under Contract No. DAAH01-96-C-R121, awarded by U.S. Army Missile Command. The Government may have certain rights in this invention.

BACKGROUND OF THE INVENTION

1. Field of the Invention

The present invention relates to video management systems. More specifically, the invention is directed to a system for automatically processing a video sequence to extract metadata that provides an adequate visual representation of the video.

2. Description of the Related Technology

The management of video data is a critical information management problem. The value of video footage can be effectively utilized only when it can be reused and repurposed in many different contexts. One of the key requirements to effectively access video from a large collection is the ability to retrieve video information by content. Content-based retrieval of video data demands a computer-readable representation of video. This representation of the original video data is called metadata. The metadata includes a representation of the visual, audio and semantic content. In other words, a good representation of a video should effectively capture the look of the video, its sound and its meaning. An effective representation of the video captures the essence of the video in as small a representation as possible. Such representations of the video can be stored in a database. A user trying to access video from a collection can query the database to perform a content-based search of the video collection to locate the specific video asset of interest. FIG. 1 illustrates a block diagram of a video database system 100. Such a system is described in Designing Video Data Management Systems, Arun Hampapur, University of Michigan, 1995, which is herein incorporated by reference. Video data 102 is input into a Metadata Extraction module 104. The resultant metadata is stored in a database system 106 by use of an insertion interface 108.

The extraction (104) of metadata from the actual video data 102 is a very tedious process called video logging or manual annotation. Typically this process requires on average labor of eight times the length of the video. What is desired is a system which would automatically process a video so as to extract the metadata from a video sequence of frames that provides a good visual representation of the video.

Some of the terminology used in the description of the invention will now be discussed. This terminology is explained with reference to a set of example images or frames shown in FIG. 2. Image one shows a brown building 120 surrounded by a green lawn 122 with a blue sky 124 as a background. Image two shows a brown car 126 on a green lawn 128 with a blue sky 130 as a background. Let us assume that these two frames are taken from adjacent shots in a video. These two frames can be compared based on several different sets of image properties, such as color properties, distribution of color over the image space, structural properties, and so forth. Since each image property represents only one aspect of the complete image, a system for generating an adequate representation by extracting orthogonal properties from the video is needed. The two images in FIG. 2 would appear similar in terms of their chromatic properties (both have approximately the same amount of blue, green and brown color's) but would differ significantly in terms of their structural properties (the location of edges, how the edges are distributed and connected to each other, and so forth).

An alternate scenario is where the two images differ in their chromatic properties but are similar in terms of their structural properties. An example of such a scenario occurs when there are two images of the same scene under different lighting conditions. This scenario also occurs when edit effects are introduced during the film or video production process like when a scene fades out to black or fades in from black.

Given any arbitrary video, the process used for generating an adequate visual representation of the video must be able to effectively deal with the situations outlined in the above discussion. The use of digital video editors in the production process is increasing the fraction of frames which are subjected to digital editing effects. Thus an effective approach to generating adequate visual representations of videos is desired that uses both chromatic and structural measurements from the video.

Several prior attempts at providing an adequate visual representation of the visual content of a video have been made: Arun Hampapur, Designing Video Data Management Systems, The University of Michigan, 1995; Behzad Shahraray, Method and apparatus for detecting abrupt and gradual scene changes in image sequences, AT&T Corp, 32 Avenue of the Americas, New York, N.Y. 10013–2412, 1994, European Patent Application number 066327 A2; Hong Jiang Zhang, Stephen W Smoliar and Jian Hu Wu, A system for locating automatically video segment boundaries and for extracting key-frames, Institute of System Science, Kent Ridge, Singapore 0511, 1995, European Patent Application number 0 690413 A2; and Akio Nagasaka and Yuzuru Tanaka, "Automatic Video Indexing and Full-Video Search for Object Appearances", *Proceedings of the 2nd Working Conference on Visual Database Systems*, p.119–133, 1991. Most existing techniques have focused on detecting abrupt and gradual scene transitions in video. However, the more essential problem to be solved is deriving an adequate visual representation of the visual content of the video.

Most of the existing scene transition detection techniques, including Shahraray and Zhang et al., use the following measurements for gradual and abrupt scene transitions: 1) Intensity based difference measurements wherein the difference between two frames from the video which are separated by some time interval "T", is extracted. Typically, the difference measures include pixel difference measures, gray level global histogram measures, local pixel and histogram difference measures, color histogram measures, and so forth. 2) Thresholding of difference measurements wherein the difference measures are thresholded using either a single threshold or multiple thresholds.

However, to generate an adequate visual representation of the visual content of the video, a system is needed wherein the efficacy of the existing techniques is not critically dependent on the threshold or decision criteria used to declare a scene break or scene transition. Using existing techniques, a low value of the threshold would result in a oversampled representation of the video, whereas, a higher value would result in the loss of information. What is needed is a system wherein the choice of the decision criteria is a non-critical factor.

SUMMARY OF THE INVENTION

One embodiment of the present invention includes a computer-based system for identifying keyframes or a visual representation of a video by use of a two stage measurement process. Frames from a user-selected video segment or sequence are processed to identify the keyframes. The first stage preferably includes a chromatic difference measurement to identify a potential set of keyframes. To be considered a potential frame, the measurement result must exceed a user-selectable chromatic threshold. The potential set of keyframes is then passed to the second stage which preferably includes a structural difference measurement. If the result of the structural difference measurement then exceeds a user-selectable structural threshold, the current frame is identified as a keyframe. The two stage process is then repeated to identify additional keyframes until the end of the video. If a particular frame does not exceed either the first or second threshold, the next frame, after a user-selectable time delta, is processed.

The first stage is preferably computationally cheaper than the second stage. The second stage is more discriminatory since it preferably operates on a smaller set of frames. The keyframing system is extensible to additional stages or measurements as necessary.

In one aspect of the invention, there is a method for detecting scene changes in a digital video data stream displayed upon a monitor coupled to a computer executing an operating system including a software display control program operative to control display of all information displayed upon the monitor, said method comprising the steps of (a) providing a scene detection software program executed by the computer, wherein said scene detection software program and said software display control program are separate programs, said scene detection software program performing the following steps: (b) retrieving information for each first pixel in a first frame of the digital video data stream from said software display control program; (c) retrieving information for each second pixel in a second frame of the digital video data stream from said software display control program; and (d) detecting a scene change if the second pixel information differs from the first pixel information by more than a predetermined amount.

In another aspect of the invention, there is a method for detecting scene changes in a digital video data stream displayed upon a monitor coupled to a computer executing an operating system including a software display control program operative to control display of all information displayed upon the monitor, said method comprising the steps of (a) providing a scene detection software program executed by the computer, wherein said scene detection software program and said software display control program are separate programs, said scene detection software program performing the following steps: (b) retrieving information for each first pixel in a first frame of the digital video data stream from said software display control program; (c) retrieving information for each second pixel in a second frame of the digital video data stream from said software display control program; (d) detecting a scene change if the second pixel information differs from the first pixel information by more than a predetermined amount; (e) recording an index representative of where the scene change occurred in the digital video data stream; and (f) recording a representative frame of a scene bounded by the scene change.

In another aspect of the invention, there is a method for detecting scene changes in a digital video data stream displayed upon a monitor coupled to a computer executing an operating system including a software display control program operative to control display of all information displayed upon the monitor, said method comprising the steps of (a) providing a scene detection software program executed by the computer, wherein said scene detection software program and said software display control program are separate programs, said scene detection software program performing the following steps: (b) retrieving information for a first frame of the digital video data stream from said software display control program; (c) retrieving information for a second frame of the digital video data stream from said software display control program; and (d) detecting a scene change between the first frame and the second frame using the first frame information and the second frame information.

In yet another aspect of the invention, there is a method for detecting scene changes in a digital video data stream displayed upon a monitor coupled to a computer executing an operating system including a software display control program operative to control display of all information displayed upon the monitor, said method comprising the steps of (a) providing a scene detection software program executed by the computer, wherein said scene detection software program and said software display control program are separate programs, said scene detection software program performing the following steps: (b) retrieving digital video data stream information from said software display control program; and (c) detecting a scene change in said digital video data stream using said information.

BRIEF DESCRIPTION OF THE DRAWINGS

FIG. 9 is a diagram showing a set of video frames at the output of the chromatic difference stage of the keyframing system of FIG. 3; and FIG. 10 is a diagram showing a set of video frames at the output of the structural difference stage of the keyframing system of FIG. 3.

DETAILED DESCRIPTION OF THE PREFERRED EMBODIMENT

The following detailed description of the preferred embodiment presents a description of certain specific embodiments of the present invention. However, the present invention can be embodied in a multitude of different ways as defined and covered by the claims. In this description, reference is made to the drawings wherein like parts are designated with like numerals throughout.

For convenience, the discussion of the preferred embodiment will be organized into the following principal sections: Introduction, System Overview, Hierarchical Method of Keyframe Extraction, Keyframing Program, and Measurements Types, Image Processing Procedures, and Results and Summary.

1.0 Introduction

A visual representation of a video is a subset of the images chosen from the video based on some sampling criteria. The keyframing algorithm presented here uses a visual similarity metric to extract a visual representation of the video. The visual representation of the video is defined as the smallest subset of frames that can be chosen from the video which adequately represent the video. The adequacy of the visual representation is controlled by the user through the use of a set of thresholds.

An adequate visual representation of a video is a subset of frames which captures all the visual events in the video without duplicating visually similar frames. According to this definition, a visual representation is not adequate if it misses any visually distinct frames from the video. It is also not adequate if two frames in the representation are not sufficiently distinct.

The visual representation of a video depends on the domain from which the video data is derived. For example, a video from a video conference can be adequately represented by choosing one frame from every shot (a continuous take by a video camera), since each shot would have very little action (e.g., has mostly talking head shots). A video from a football game will need more than one frame per shot for an adequate visual representation, since video shots in football games tend to track the play from one end of the field to the other.

The present invention uses a staged hierarchical approach. In this approach, the decision criteria of the first level can be made less rigid to allow an oversampling. The oversampled set can then be further refined at the second stage to remove redundant representation. In addition, the technique presented uses the structure of the contents of the frame in addition to the intensity distributions. The use of structural information from the image makes the approach less sensitive to intensity changes in the video.

2.0 System Overview

Figure 1:
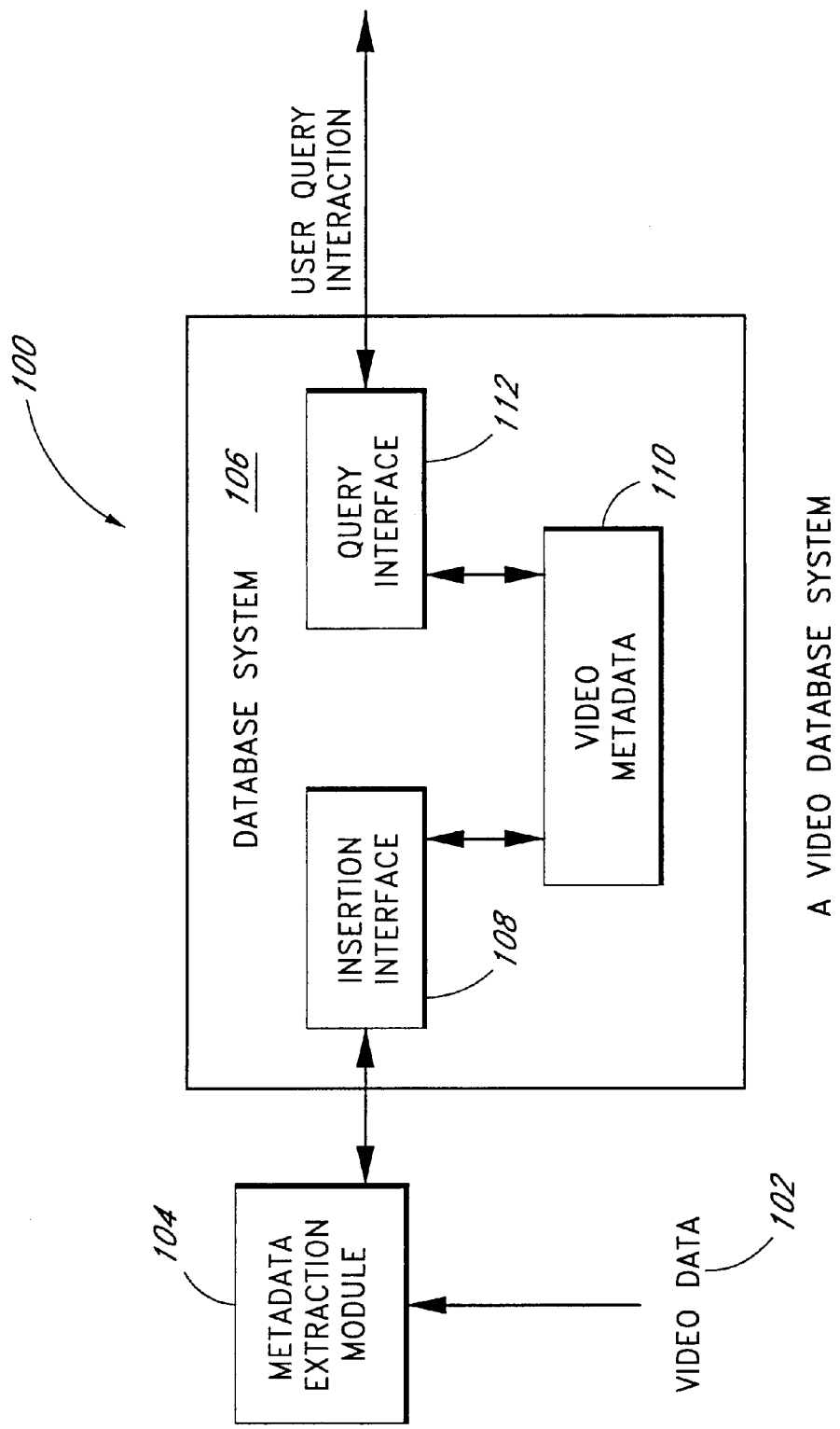
FIG. 1 is a block diagram showing a video data system wherein the presently preferred key frame system may be utilized.
Figure 2:
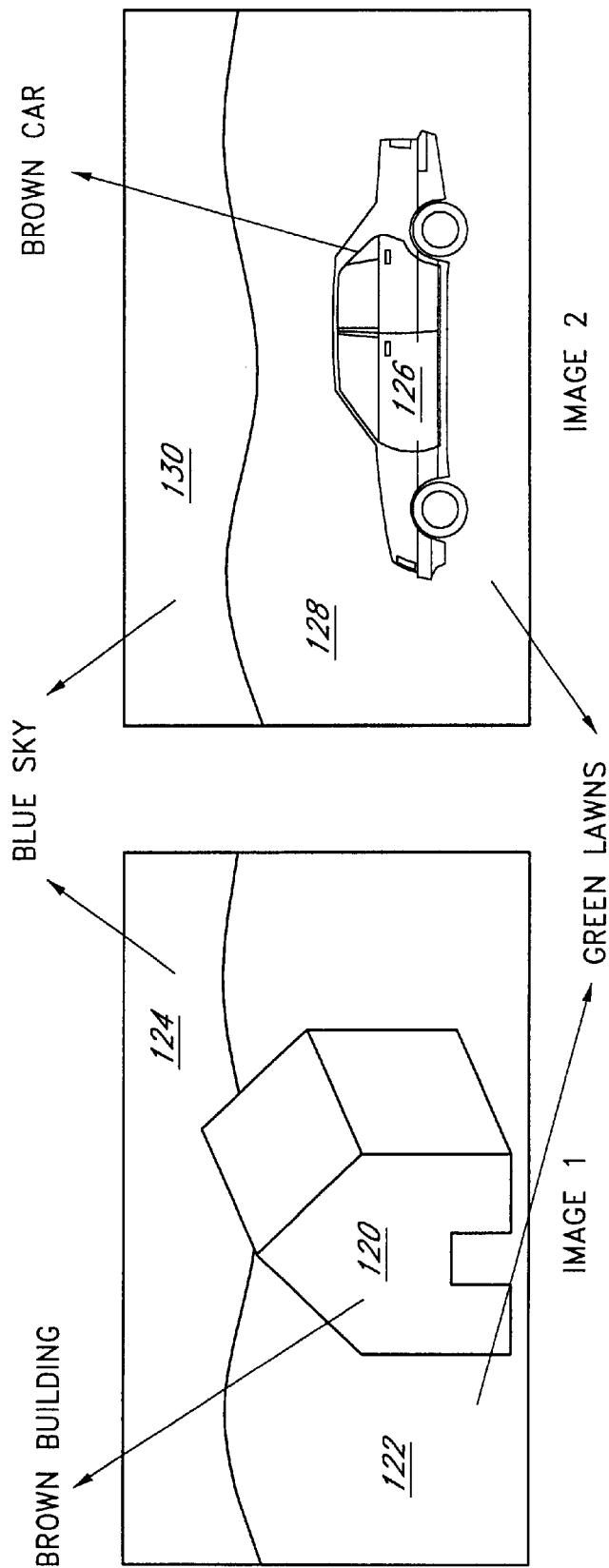
FIG. 2 is a block diagram of two exemplary video frames showing chromatic and structural properties useful in operation of a preferred keyframing system that is a portion of the metadata extraction module shown FIG. 1.
Figure 3:
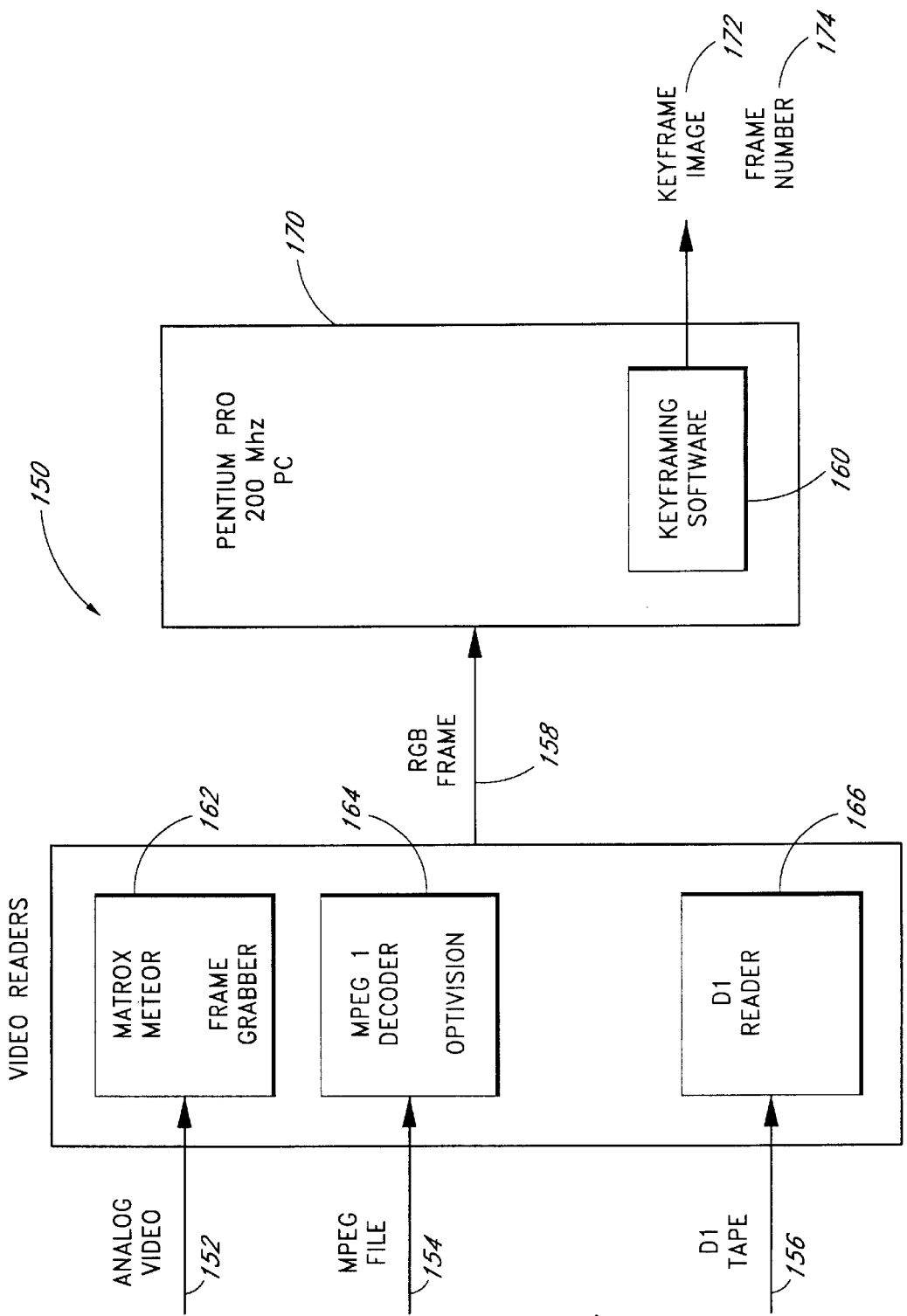
FIG. 3 is a block diagram of the presently preferred keyframing system.

A keyframing system 150 used for extracting the visual representation of the video is shown in FIG. 3. A keyframing algorithm that is a portion of the keyframing software 160 operates on Red/Green/Blue (RGB) frame buffers 158 captured from the video. The video can be in a variety of well-known formats, such as analog video 152, MPEG file 154, or D1 format video tape 156. Each of these formats utilizes a suitable video reader or frame grabbers which can be used to digitize or decode the video into a sequence of RGB frame buffers 158. For example, the analog video 152 uses a frame grabber 162, such as Matrox Meteor, the MPEG video 154 uses a MPEG1 decoder 164, such as available from Optivision, and the D1 video 156 uses a D1 reader 166. The keyframing program 160 described below assumes a sequence of RGB frames 158, and a frame number relative to the beginning of the video to be used as a starting frame number. The output of the keyframing program 160 includes a set of keyframe images 172 and corresponding frame numbers 174.

The keyframing system 150 includes a computer 170 that executes the keyframing software 160. The preferred computer is a personal computer having, at a minimum, an Intel Pentium Pro processor running at 200 MHz, 32 Mb of main memory, and two Gb of mass storage, such as a video-optimized hard drive. The preferred operating software is Windows NT, version 4.0, available from Microsoft. However, other 32-bit operating software systems and comparable processors could be used for running the keyframing program.

3.0 Hierarchical Method of Keyframe Extraction

Figure 4:
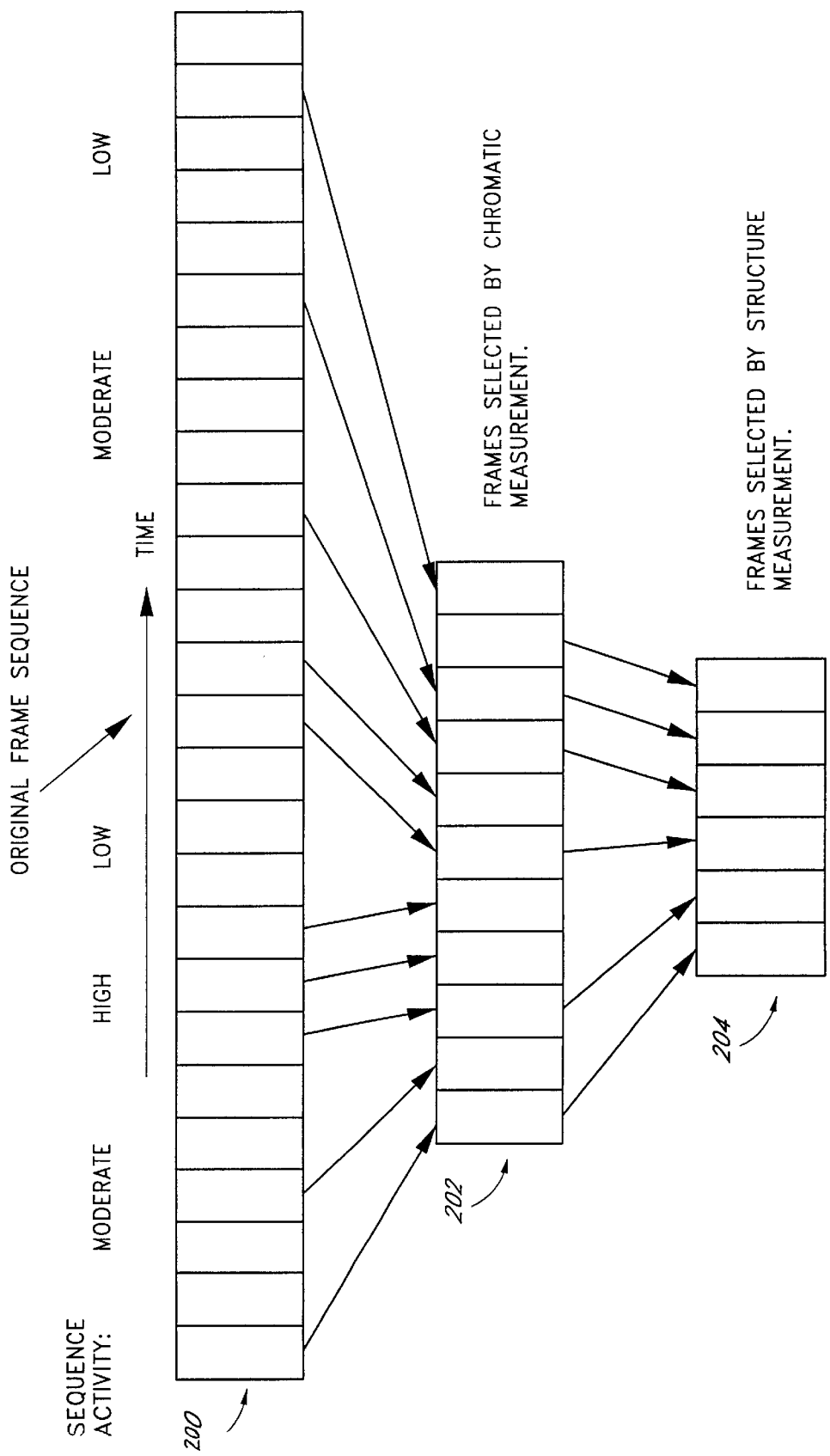
FIG. 4 is a block diagram of frame sequences illustrating operation of the preferred keyframing system of FIG. 3.

The method of extracting the visual representation involves a two stage process. The first stage processes the raw video to extract a set of frames which are visually distinct based on the chromatic difference measure and a user supplied chromatic difference threshold. The second stage operates on frames which have been chosen by the first stage. Frames in this stage are compared based on the structure difference measure and a user provided structure difference threshold. FIG. 4 shows exemplary sets of frames of the staged hierarchical architecture. The first stage samples frames from a video 200 based on the chromatic activity in the video. The number of frames 202 output by the chromatic difference measurement is proportional to the overall activity in the video 200. A talking head video (e.g., a news anchor person shot) will generate a smaller number of output frames than the video of a sporting event (e.g., a fast break in basketball game).

While operating on a typical produced video, such as television feed, the chromatic difference measurement may be tuned to pick up frames during gradual transitions, such as fades, dissolves, wipes and so forth. These frames are typically chromatically different but structurally similar. The redundancy in the output of the chromatic difference based measurement is filtered out by the structural difference measurement, which produces the actual keyframes 204. For example, frames in a fade have the same structure, but are significantly different chromatically due to the fading effect.

Thus, the combination of two or more orthogonal image features in a hierarchical manner provides significant improvement in generating an adequate representation of the video while keeping the computational process simple and efficient. The first feature measurement is selected to be computationally cheaper than the second measure. The second feature measurement is a more discriminatory measurement that extracts more information from a frame than the first measure. The hierarchical method can be extended to "N" stages or measures.

4.0 Keyframing Program

This section presents a detailed description of the algorithm for the keyframing program used in this embodiment of the invention. The following list of symbols are used in the description of the algorithm.

4.1 Symbols Used

Figure 5:
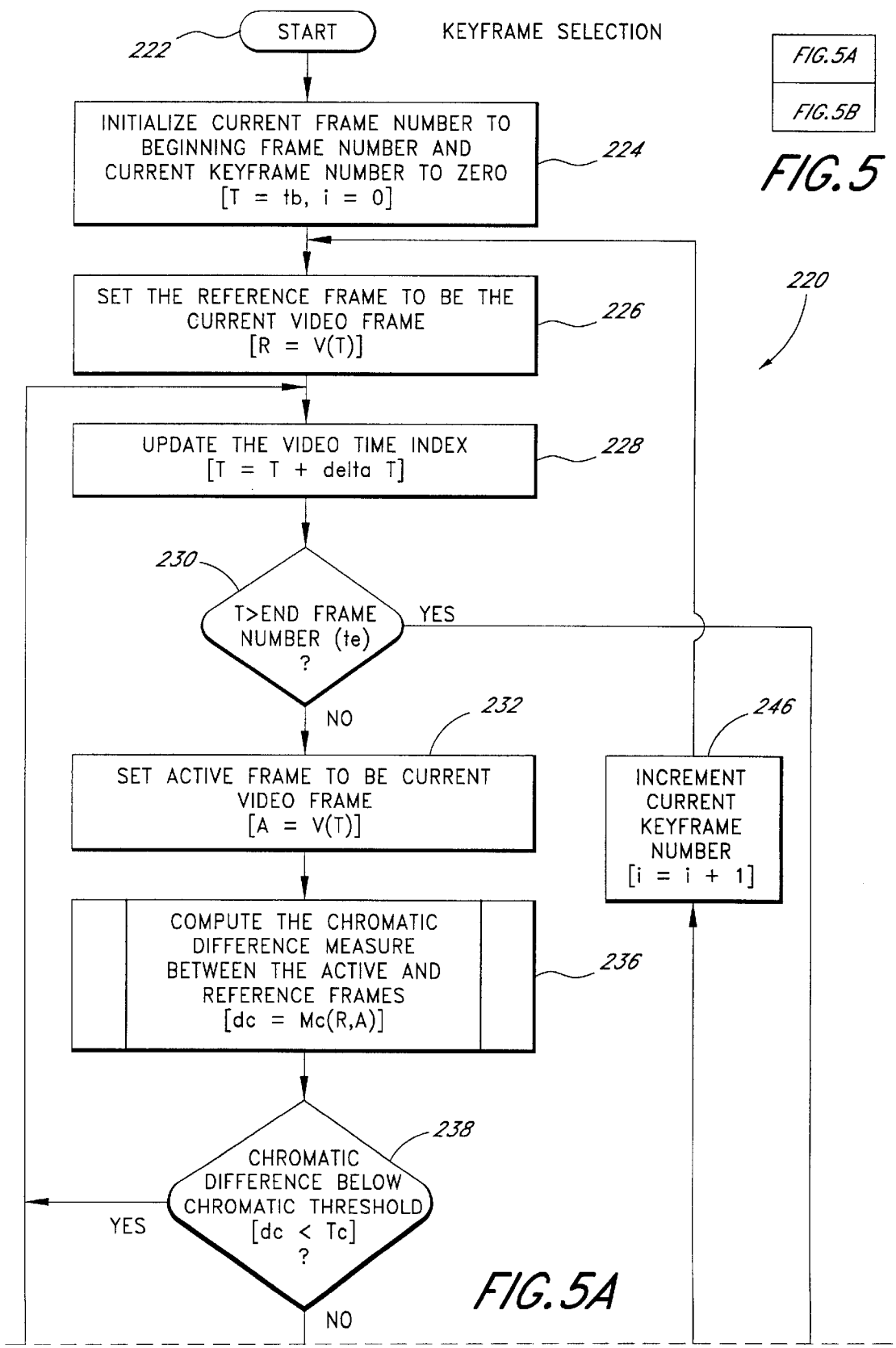
FIG. 5 is a top-level operational flow diagram of the key frame selection system shown in FIG. 3.
Figure 5B:
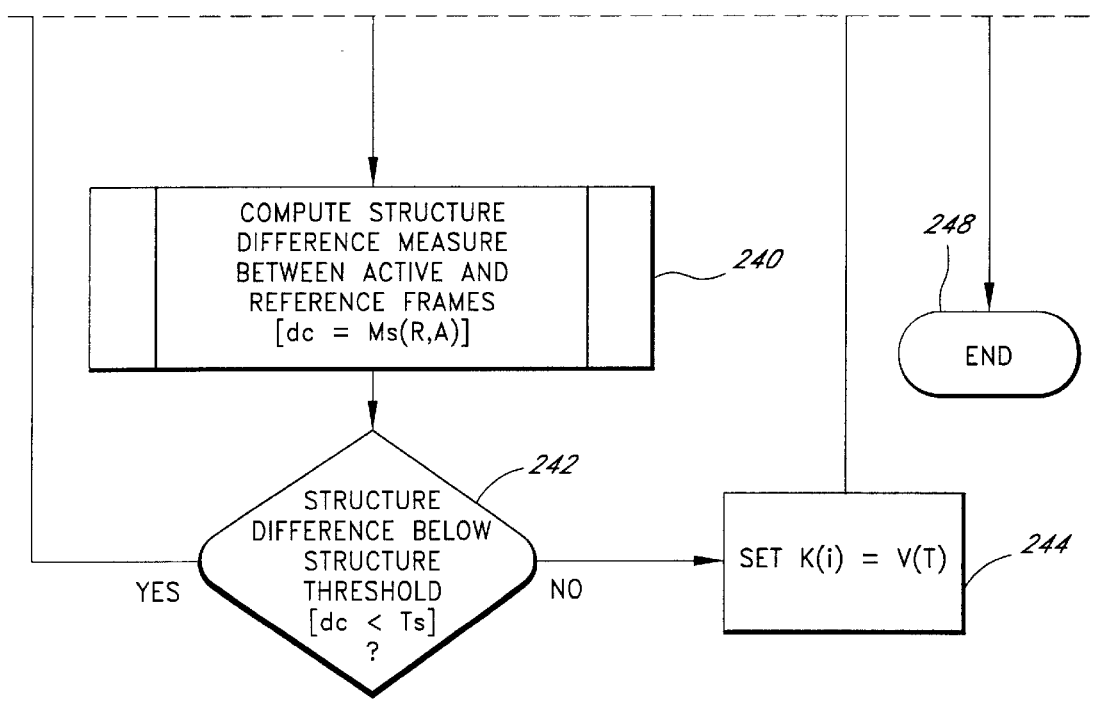

V=Time Indexed Video Sequence (set of RGB frames)
T=Current Frame Number
$t_b$=Begin Frame Number
$t_e$=End Frame Number
$\Delta T$=Time Increment Factor
i=Current Keyframe Number
R=Reference Frame
A=Active Frame
$M_c$=Chromatic Difference Measure $d_c$=Chromatic Distance
$M_s$=Structure Difference Measure
$d_s$=Structure Distance
$T_c$=Chromatic Difference Threshold
$T_s$=Structure Difference Threshold
K=Keyframe Storage List 4.2 Keyframing Process Steps Referring to FIG. 5, a keyframe selection process 220, which comprises the keyframing software 160 (FIG. 3) executed by the computer 170, will now be described. As shown in FIG. 3, the input to the program is a sequence of RGB frames, and also includes the initial and final frame numbers of the sequence. Beginning at a start state 222, process 220 moves to state 224 wherein the Current Video Frame number is initialized to the Initial Frame number of the video sequence (T=$t_b$), and the Current Keyframe number (i) is initialized to zero. Proceeding to state 226, process 220 sets the Reference Frame to be the Current Video Frame (R=V(T)). Continuing at state 228, process 220 updates the video time index (T=T+$\Delta$T). The time interval, or delta T, is settable by the user of the program, which permits tuning of the keyframe selection process 220. For example, the time interval can be set to advance to the next frame in the sequence, or the time interval can be set to advance four frames in the sequence. The latter case would allow faster processing of the video sequence, but some of the potential keyframes may be missed, which would not provide the best visual representation of the video.

Advancing to a decision state 230, process 220 determines if the end of the video sequence has been reached by checking if Current Frame number is greater than the ending frame number (T>$t_e$). If so, all the frames in the video have been checked and the keyframe selection process completes at end state 248. If the end of the video sequence has not been reached, as determined at state 230, process 220 proceeds to state 232 wherein the Active Frame is set to be the Current Video Frame (A=V(T)). Moving to function 236, process 220 computes the Chromatic Difference Measure between the Active and Reference Frames using the procedure described in section 5.1 below ($d_c$=$M_c$(R,A)).

Proceeding to a decision state 238, process 220 determines if the chromatic distance derived by function 236 is below the chromatic threshold ($d_c$<$T_c$). The chromatic threshold is settable by a user of the keyframing system. If the chromatic distance is below the chromatic threshold, that is, there is not enough chromatic change between the two frames being compared, the Current Frame is not a candidate to be a key frame. Process 220 then moves back to state 228 wherein the next frame to be compared is selected. If the chromatic distance is equal to or greater than the chromatic threshold, the Current Frame is a candidate to be a key frame and corresponds to one of the frames 202 (FIG. 4). Process 220 then passes the frame on to the next stage at function 240 wherein the Structure Difference Measure is computed between the Active and Reference Frames using the procedures in section 5.2 ($d_s$=$M_s$(R,A)). Note that either the procedure to determine a Structural Difference based on Edge Orientation $M_{So}$ or the procedure to determine a Structural Difference based on Edge Moments $M_{Sm}$ may be used, as determined by the user's needs.

Proceeding to a decision state 242, process 220 determines if the structure distance derived by function 240 is below the structure threshold ($d_c$<$T_s$). The structural threshold is settable by a user of the keyframing system. If the structural distance is below the structural threshold, that is, there is not enough structural change between the two frames being compared, the Current Frame is not a key frame. Process 220 then moves back to state 228 wherein the next frame to be compared is selected. If the structural distance is equal to or greater than the structural threshold, the Current Frame is identified as a key frame and corresponds to one of the frames 204 (FIG. 4). Process 220 then proceeds to state 244 and sets the Current Keyframe to the Current Video Frame (K(i)=V(T)) to facilitate selection of the reference frame at state 226. Process 220 continues at state 246 and increments the Current Keyframe Number (i=i+1). The keyframe and frame number are preferably stored in an array or list indexed by Current Keyframe Number (i). Process 220 then moves back to state 226 to start the keyframe process again using the new keyframe identified at state 244 as a new Reference Frame. Process 220 continues to process the frames in the video sequence until the end is reached, as determined at state 230.

5.0 Measurements Types

The algorithm described in section 4.2 has two primary image feature extraction processes namely, the chromatic difference measurement and the structural difference measurement. The chromatic measurements filter the video based on the brightness and color differences between the frames. The degree of discrimination provided by any particular specific chromatic measure is bounded due to the fact that these measures rely on the color and intensity distributions. Applying the structural difference metric to the set of frames selected by the chromatic difference metric provides a new dimension along which the frames can be compared. The arrangement of these two metrics in a hierarchy along with the use of the thresholds allows the efficient generation of adequate visual representations of the video.

5.1 Chromatic Difference Measurement: $M_c$(R,A) (236, FIG. 5)

The chromatic difference measurement operates on a pair of frames (RGB buffers) and computes the chromatic distance between the frames. Chromatic difference measurements cover a wide range of measurements, such as luminance pixel differences, color pixel differences, local intensity histogram differences, global intensity histogram differences and so forth. In this embodiment of the invention, a gray level intensity histogram-based chromatic difference measurement is utilized.

5.1.1 Chromatic Difference Measurement Based on Intensity Histograms

Figure 6:
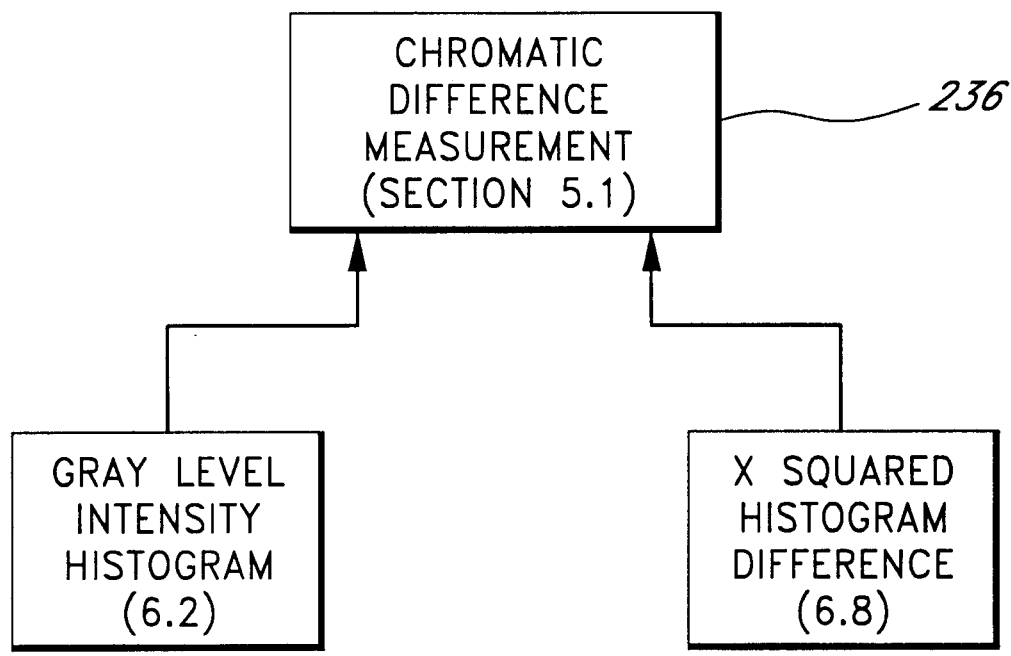
FIG. 6 is a block diagram of the two functions utilized in the "chromatic difference measure" function shown in FIG. 5.

This measurement uses the gray level intensity histogram of the two frames. This is a measure of how the intensities vary in the frame. The histogram of the reference frame is compared to the histogram of the active frame using the $\chi^2$ metric. The $\chi^2$ distance is used as the chromatic difference between the reference and active frames. The steps in the algorithm are discussed below. The functions used in the chromatic difference measurement (236) and the functional interrelationship are shown in FIG. 6.

Step 1:
Compute the intensity histogram of reference frame $H_R$ using procedure in section 6.2.

Step 2:
Compute the intensity histogram of the active frame $H_A$ using procedure in section 6.2.

Step 3:
Compute the difference of the histograms using the procedure in section 6.8.

Step 4:
Set the chromatic difference to be the $\chi^2$ distance.
$X^2H$=The histogram difference measurement
$H_A(i)$=n bit gray scale histogram of the Active Frame
$H_R(i)$=n bit gray scale histogram of the Reference Frame N=is the number of gray levels

5.2 Structure Difference Measurement: $M_s$ (240, FIG. 5)

This measurement operates on two RGB frames and computes the structural distance between the frames. The structure difference measurement includes any measurement which compares images based on the structure (edge) content of the image. In this embodiment of the invention, edge orientation histogram difference and edge moment difference are utilized as two types of structure difference measurement techniques. Either type can be used as the structural difference measurement 240.

5.2.1 Structural Difference Based on Edge Orientation $M_{So}$

Figure 7:
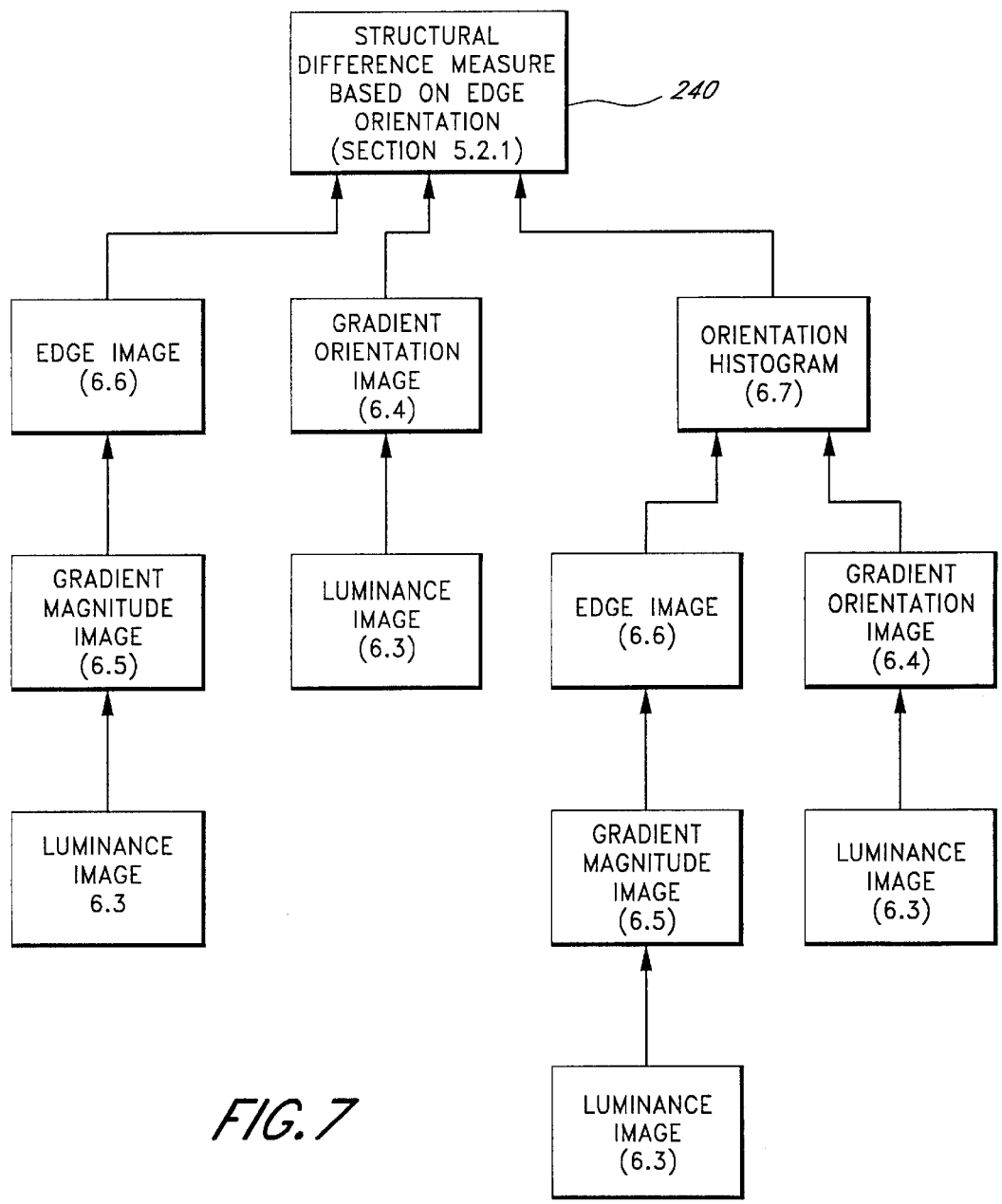
FIG. 7 is a block diagram of a set of functions, based on edge orientation, utilized in the "structural difference measure" function shown in FIG. 5.

This measurement computes the structural difference between the reference and active frames by measuring the $\chi^2$ difference between the edge orientation histograms of the two images. The edge orientation histogram captures the global structure of the image. It captures the dominant directions in which the major edges in the image are distributed. The difference measure is generated by comparing the two edge orientation histograms using the $\chi^2$ difference metric. The steps in the algorithm are discussed below. The functions used in this edge orientation type measurement (240) and the functional interrelationship are shown in FIG. 7.

Step 1:
  Let $E_R$ be the edge mask for reference image R using procedure in section 6.6
Step 2:
  Let $E_A$ be the edge mask for active image A using procedure in section 6.6
Step 3:
  Let $G_{R\theta}$ be the gradient orientation image of the reference image computed using the procedure in section 6.4
Step 4:
  Let $G_{A\theta}$ be the gradient orientation image of the active image computed using the procedure in section 6.4
Step 5:
  Let $H_{R\theta}$ be the edge orientation histogram computed based on $E_R$ and $G_{R\theta}$ using procedure in section 6.7
Step 5:
  Let $H_{A\theta}$ be the edge orientation histogram computed based on $E_R$ and $G_{A\theta}$ using procedure in section 6.7
Step 6:
  Compute the $\chi^2$ difference between the orientation histograms using $H_{R\theta}$ and $H_{A\theta}$
Step 7:
  Set the structure difference to be the $\chi^2$ distance.

5.2.2 Structural Difference Based on Edge Moments $M_{Sm}$

Figure 8:
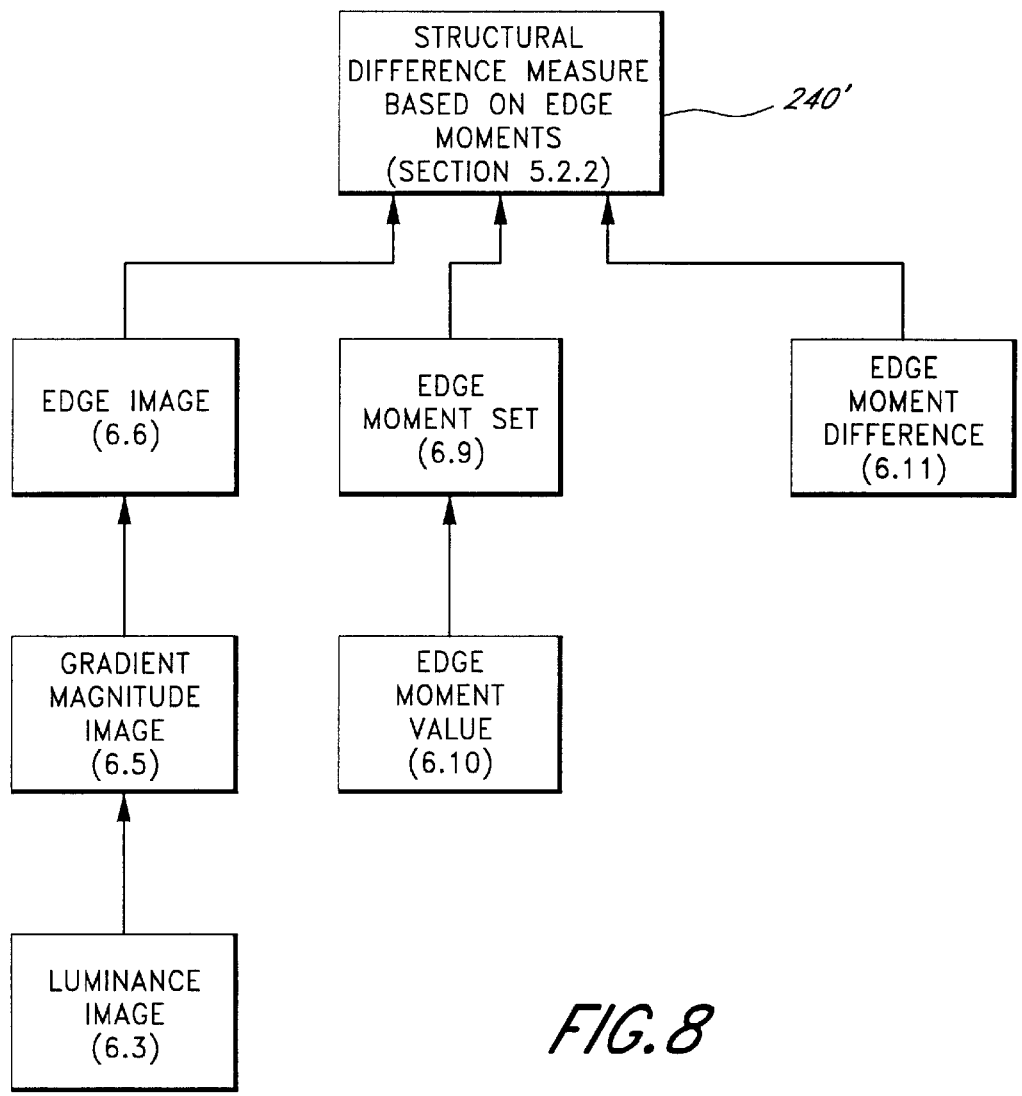
FIG. 8 is a block diagram of a set of functions, based on edge moments, utilized in the "structural difference measure" function shown in FIG. 5.

The moments of the edge image are a statistical measure of the spatial distribution of edges in the image. In this embodiment, the first five moments of the edge image are utilized to represent the structure of the image. The moments are normalized. The moments of the reference and active images are compared by computing an energy difference between the two sets of moments. The algorithm for comparing the moment based structural difference is presented below. The functions used in this edge moments type measurement (240') and the functional interrelationship are shown in FIG. 8.

Step 1:
  Let $E_R$ be an edge image of the reference frame generated using the procedure in section 6.6.
Step 2:
  Let $E_R$ be an edge image of the active frame generated using the procedure in section 6.6.
Step 3:
  Let M, N be the number of moments to be computed in the X and Y directions.
Step 4:
  Let $m_R$ be the moment set for the reference image computed using the procedure in section 6.9
Step 5:
  Let $m_A$ be the moment set for the active image computed using the procedure in section 6.9
Step 6:
  Let $d_s$ be the difference in the moments of $m_R$, $m_A$ computed using the procedure in section 6.11

6.0 Image Processing Procedures

The following procedures are used in computing the Measurements from the frames. The procedures described in here are used by practitioners in the field of computer vision. Most of these algorithms can be found in text books dealing with computer vision. Specifically most of the information used here in has been derived from Ramesh Jain, Rangachar Kasturi and Brian G. Schunck, Introduction to Machine Vision, McGraw Hill, 1995, incorporated herein by reference.

6.1 Symbols Used

H=Histogram of the frame
i=Gray Level Intensity at a Pixel
F=RGB video frame
$F_r$=Red channel of F
$F_g$=Green channel of F
$F_b$=Blue channel of F
x=Index into the frame
δx=Index increment
δy=Index increment
y=Index into the frame
X=Width of the frame in pixels
Y=Height of the frame in pixels

6.2 Gray Level Intensity Histogram Computation

This process uses a color (RGB) image and generates the luminance or brightness histogram of the image.

Step 1:
  Set the image indices to 0
    x=0, y=0
Step 2:
  Increment the image index
    x=x+δx
Step 3:
  If x>X go to Step 10
Step 4:
  Set
    y=0
Step 5:
  Increment the image index
    y=y+δy
Step 6:
  If y>Y go to Step 2
Step 7:
  Compute the Intensity value at the pixel.
    $I=0.114 \times F_r(x,y)+0.587 \times F_g(x,y)+0.299 \times F_b(x,y)$
Step 8:
  Increment the corresponding histogram bin
    H(I)=H(I)+1

Step 9:
  Go to Step 5
Step 10:
  End

6.3 Luminance Image Computation

This computation uses a color image (RGB) and converts it into a gray scale image by combining the individual color bands of the image. The constants used in Step 7 can be found in Ramesh Jain, Rangachar Kasturi and Brian G. Schunck, Introduction to Machine Vision, McGraw Hill, 1995.

Step 1:
  Set the image indices to 0
    x=0, y=0
Step 2:
  Increment the image index
    x=x+δx
Step 3:
  If x>X go to Step 9
Step 4:
  Set
    y=0
Step 5:
  Increment the image index
    y=y+δy
Step 6:
  If y>Y go to Step 2
Step 7:
  Compute the Intensity value at the pixel.
    I(x,y)=0.114×F$_r$(x,y)+0.587×F$_g$(x,y)+0.299×F$_b$(x,y)
Step 8:
  Go to Step 5
Step 9:
  End

6.4 Gradient Orientation Image Computation

This process acts on an RGB image to produce an image where each pixel in the image represents the direction or angle of the gradient (step 4) at that pixel. This is an intermediate step in the computation of edge orientation histogram.

Step 1:
  Let I be the intensity image generated from RGB buffer using the procedure in section 6.3.
Step 2:
  Let the G$_x$ be x gradient image generated using the Sobel edge mask M$_y$(i,j) (see page 147, Ramesh Jain, Rangachar Kasturi and Brian G. Schunck, Introduction to Machine Vision, McGraw Hill, 1995).

$G_x(x,y)=I(x,y)*M_y(i,j)$

Step 3:
  Let the G$_y$ be y gradient image generated using the Sobel edge mask M$_y$(i,j) (see page 147, Ramesh, Rangachar Kasturi and Brian G. Schunck, Introduction to Machine Vision, McGraw Hill, 1995).

$G_y(x,y)=I(x,y)*M_x(i,j)$

Step 4:
  Let G$_θ$ be the gradient orientation image.

$$G_\theta(t, x, y) = \tan^{-1}\left(\frac{G_Y(t, x, y)}{G_X(t, x, y)}\right)$$

6.5 Gradient Magnitude Image Computation

This process acts on an RGB buffer to produce an image where each pixel represents the magnitude of the gradient (step 4) at that point. This is an intermediate step in the computation of an edge image.

Step 1:
  Let I be the intensity image generated from RGB buffer using the procedure in section 6.3.
Step 2:
  Let the G$_x$ be x gradient image generated using the Sobel edge mask M$_x$(i,j) (see page 147, Ramesh Jain, Rangachar Kasturi and Brian G. Schunck, Introduction to Machine Vision, McGraw Hill, 1995).

$G_x(x,y)=I(x,y)*M_y(i,j)$

Step 3:
  Let the G$_y$ be y gradient image generated using the Sobel edge mask M$_y$ (i,j) (see page147, Ramesh Jain and Rangachar Kasturi and Brian G Schunck, Introduction to Machine Vision, McGraw Hill, 1995).

$G_y(x,y)=I(x,y)*M_x(i,j)$

Step 4:
  Let G$_M$ be the gradient magnitude image.

$G_M(t,x,y)=\sqrt{G^2_X+G^2_Y}$

6.6 Edge Image Computation

An edge image is an image which outlines only the significant edges in the source image. A pixel in an image is marked as a significant edge if the gradient magnitude at that point exceeds a preset edge threshold. The value of the edge threshold is experimentally chosen. There are several automatic techniques for selecting thresholds discussed in literature (Ramesh Jain, Rangachar Kasturi and Brian G. Schunck, Introduction to Machine Vision, McGraw Hill, 1995).

Step 1:
  Let G$_M$ be the gradient magnitude image computed using the procedure in section 6.5
Step 2:
  Let T$_e$ be a predetermined edge threshold.
Step 3:
  Let E be the edge image generated by thresholding the gradient magnitude image (see page 143, Ramesh Jain and Rangachar Kasturi and Brian G. Schunck, Introduction to Machine Vision, McGraw Hill, 1995).

6.7 Orientation Histogram Computation

The orientation histogram captures the distribution of edge orientations in the image. The following are the steps in the orientation histogram computation procedure. This procedure operates on an edge image and a gradient orientation image to generate an orientation histogram.

Let E be an edge image generated using the procedure in section 6.6.

Let $G_\theta$ be the gradient magnitude image generated using the procedure in section 6.4.

Step 1:
 Set the image indices to 0
  x=0, y=0

Step 2:
 Increment the image index
  x=x+δx

Step 3:
 If x>X go to Step 11

Step 4:
 Set
  y=0

Step 5:
 Increment the image index
  y=y+δy

Step 6:
 If y>Y go to Step 2

Step 7:
 If the current pixel is not a valid edge pixel.
  E(x,y)≠Valid Edge Pixel Go to Step 10

Step 8:
 Let θ=$G_\theta$(x,y)

Step 9:
 Increment the corresponding histogram bin
  H(θ)=H(θ)+1

Step 10:
 Go to Step 5

Step 11:
 End 6.8 $\chi^2$ Histogram Difference Computation

This is a specific type of histogram comparison. This technique does a bin by bin differencing of the two histograms and normalizes the difference by the sum of the corresponding bins in the histogram. The normalization makes the differencing less sensitive to small changes in the histogram. The following is the procedure for computing the $\chi^2$ difference of two histograms $H_1$ and $H_2$.

$$X_H^2 = \sum_{i=0}^{N} \frac{|H_1(i) - H_2(i)|^2}{H_1(i) + H_2(i)} \quad (3)$$

N is the number of bins 6.9 Edge Moment Set Computation

The moments are a statistical measure of the edges properties in the image. The lower order moments capture the gross structure of the edges (like the centroid of edges) and the higher order moments capture the finer variations in the edge structure (like corners, highly curved edges etc). The following is the algorithm for computing the moments.

Step 1:
 Let M be the number of moments to be computed in the X direction.

Step 2:
 Let N be the number of moments to be computed in the Y direction.

Step 3:
 Set the image indices to 0
  m=−1, n=−1

Step 4:
 Increment the index
  m=m+1

Step 5:
 If m>M go to Step 10

Step 6:
 Set
  n=−1

Step 7:
 Increment the index
  n=n+1

Step 8:
 If n>N go to Step 4

Step 9:
 Compute the moment M(m,n) using the procedure outlined in section 6.10.

Step 10:
 End 6.10 Edge Moment Value Computation

This procedure computes the (m,n)$^{th}$ moment of the edge image. This moment is computed based on the centroid of the edge image. The moments are normalized. The following formulae can be used to compute the moments.

6.11 Edge Moment Difference $$v(m, n) = \frac{e_v(m, n)}{e_n(m, n)} \quad (4)$$

$$e_v(m, n) = \sum_{x=0}^{X} \sum_{y=0}^{Y} (x - \bar{x})^m \times (y - \bar{y})^n \times E(x, y) \quad (5)$$

$$\bar{x} = \frac{\sum_{x=0}^{X} \sum_{y=0}^{Y} x \times E(x, y)}{X * Y} \quad (6)$$

$$\bar{y} = \frac{\sum_{x=0}^{X} \sum_{y=0}^{Y} y \times E(x, y)}{X * Y} \quad (7)$$

$$e_n(m, n) = \sum_{x=0}^{X} \sum_{y=0}^{Y} \|(x - \bar{x})^{(m+n)} \times E(x, y)\| + \sum_{x=0}^{X} \sum_{y=0}^{Y} \|(y - \bar{y})^{(m+n)} \times E(x, y)\| \quad (8)$$

There are several different techniques for computing the structure difference between frames using edge moments. In this embodiment, the structure difference is computed by finding the root mean square difference between the moment sets using equation 9.

$$d = \sum_{m=0}^{M} \sum_{n=0}^{N} \sqrt{(m_1(m, n) - m_2(m, n))^2} \quad (9)$$

7.0 Illustrative Results and Summary

The invention presented in the above sections has been applied to a wide variety of video sequences. FIGS. 9 and 10 show the output of the chromatic and structural stages. The images in FIGS. 9 and 10 are frames extracted from a video sequence, the number assigned to each image is the frame number of the image in the video sequence. The exemplary video sequence starts at frame number 1790 and ends at frame number 2389 for a total of 600 frames. The video has been digitized at thirty frames per second. Thus two images, which have frame numbers thirty frames apart, are spaced one second apart in the video. The images in these figures are arranged from left to right and top to bottom in order the increasing order of time.

The output of the chromatic difference measurement (FIG. 9) has twenty-four frames, and clearly, some of these frames are structurally similar. The chromatic difference measure selects frames 1802, 1804, 1833 as they are part of a fade in sequence where there are significant changes in the chromatic measurements. Frames 1921, 1937, 1950 are selected due to the fact that there is large object motion in the frame as it is a extreme close up shot. Frames 2146 to 2201 are selected due to the high degree of specular reflection in a close up shot. Frames 2280–2312 are selected due to the large object motion in an extreme close up shot.

The output of the structural difference measurement (FIG. 10) has fourteen frames. These frames are clearly structurally different and comprise an adequate visual representation of the video. The structural difference measurement eliminates the structurally similar frames.

The results discussed in this section clearly illustrate the benefits and strengths of the present invention. The approach clearly recognizes the limitations of relying completely on chromatic metrics and applies a more sophisticated measurement to overcome these limitations. The computational expense of the algorithm is kept small by using the hierarchical approach which allows the more expensive computations to be applied to a smaller set of frames. The structural computation is more discriminatory than the chromatic computation.

While the above detailed description has shown, described, and pointed out the fundamental novel features of the invention as applied to various embodiments, it will be understood that various omissions and substitutions and changes in the form and details of the system illustrated may be made by those skilled in the art, without departing from the intent of the invention.

What is claimed is:

1. A method for detecting scene changes in a digital video data stream displayed upon a monitor coupled to a computer executing an operating system including a software display control program operative to control display of all information displayed upon the monitor, said method comprising the steps of:

(a) providing a scene detection software program executed by the computer, wherein said scene detection software program and said software display control program are separate programs, said scene detection software program performing the following steps:

(b) retrieving information for each first pixel in a first frame of the digital video data stream from said software display control program;

(c) retrieving information for each second pixel in a second frame of the digital video data stream from said software display control program; and (d) detecting a scene change if the second pixel information differs from the first pixel information by more than a predetermined amount.

2. The method of claim 1, wherein said first pixel information comprises first pixel color values and said second pixel information comprises second pixel color values.

3. A method for detecting scene changes in a digital video data stream displayed upon a monitor coupled to a computer executing an operating system including a software display control program operative to control display of all information displayed upon the monitor, said method comprising the steps of:

(a) providing a scene detection software program executed by the computer, wherein said scene detection software program and said software display control program are separate programs, said scene detection software program performing the following steps:

(b) retrieving information for each first pixel in a first frame of the digital video data stream from said software display control program;

(c) retrieving information for each second pixel in a second frame of the digital video data stream from said software display control program;

(d) detecting a scene change if the second pixel information differs from the first pixel information by more than a predetermined amount;

(e) recording an index representative of where the scene change occurred in the digital video data stream; and (f) recording a representative frame of a scene bounded by the scene change.

4. The method of claim 3, wherein said first pixel information comprises first pixel color values and said second pixel information comprises second pixel color values.

5. A method for detecting scene changes in a digital video data stream displayed upon a monitor coupled to a computer executing an operating system including a software display control program operative to control display of all information displayed upon the monitor, said method comprising the steps of:

(a) providing a scene detection software program executed by the computer, wherein said scene detection software program and said software display control program are separate programs, said scene detection software program performing the following steps:

(b) retrieving information for a first frame of the digital video data stream from said software display control program;

(c) retrieving information for a second frame of the digital video data stream from said software display control program; and (d) detecting a scene change between the first frame and the second frame using the first frame information and the second frame information.

6. The method of claim 5, wherein step (d) further comprises detecting a scene change if the second information differs from the first information by more than a predetermined amount.

7. The method of claim 6, wherein:

said first frame information comprises color values for each first pixel in the first frame; and said second frame information comprises color values for each second pixel in the second frame.

8. A method for detecting scene changes in a digital video data stream displayed upon a monitor coupled to a computer executing an operating system including a software display control program operative to control display of all information displayed upon the monitor, said method comprising the steps of:

(a) providing a scene detection software program executed by the computer, wherein said scene detection software program and said software display control program are separate programs, said scene detection software program performing the following steps:

(b) retrieving digital video data stream information from said software display control program; and (c) detecting a scene change in said digital video data stream using said information.

9. The method of claim 8, wherein step (b) further comprises:
   (b.1) retrieving information for a first frame of the digital video data stream from said software display control program;
   (b.2) retrieving information for a second frame of the digital video data stream from said software display control program.

10. The method of claim 9, wherein step (c) further comprises detecting a scene change between the first frame and the second frame using the first frame information and the second frame information.

11. The method of claim 10, wherein step (c) further detecting a scene change if the second information differs from the first information by more than a predetermined amount.

12. The method of claim 11, wherein:
   said first frame information comprises color values for each first pixel in the first frame; and
   said second frame information comprises color values for each second pixel in the second frame.

* * * * *